(12) United States Patent
Frost et al.

(10) Patent No.: US 9,125,378 B1
(45) Date of Patent: Sep. 8, 2015

(54) PORTABLE PETTING DEVICE FOR PETTING OR SCRATCHING OF PETS, SUCH AS DOGS OR CATS

(71) Applicants: Darren Frost, Uniontown, PA (US); Maria Nypaver, Uniontown, PA (US)

(72) Inventors: Darren Frost, Uniontown, PA (US); Maria Nypaver, Uniontown, PA (US)

(*) Notice: Subject to any disclaimer, the term of this patent is extended or adjusted under 35 U.S.C. 154(b) by 0 days.

(21) Appl. No.: 14/300,278

(22) Filed: Jun. 10, 2014

Related U.S. Application Data (60) Provisional application No. 61/945,311, filed on Feb. 27, 2014.

(51) Int. Cl.
*A01K 13/00* (2006.01)
*A01K 29/00* (2006.01)

(52) U.S. Cl.
CPC .............. *A01K 13/004* (2013.01); *A01K 29/00* (2013.01)

(58) Field of Classification Search
CPC .................................................... A01K 13/004
USPC ......................................... 119/601, 609, 621
See application file for complete search history.

(56) References Cited

U.S. PATENT DOCUMENTS

| | | | |
|---|---|---|---|
| 2,721,538 A | 10/1955 | Latham | |
| 3,552,388 A | 1/1971 | Zelenka | |
| 3,599,606 A | 8/1971 | Hayward | |
| 3,716,029 A | 2/1973 | Pillsbury, Jr. | |
| 4,872,422 A | 10/1989 | Della Vecchia | |
| 5,016,617 A | 5/1991 | Tarlow et al. | |
| 5,540,186 A | 7/1996 | Udelle | |
| 5,595,141 A | 1/1997 | Udelle et al. | |
| 5,628,282 A | 5/1997 | Udelle | |
| 5,680,831 A | 10/1997 | Udelle | |
| 5,842,440 A | 12/1998 | Bell, Jr. | |
| 6,058,887 A | 5/2000 | Silverman | |
| 6,318,298 B1 | 11/2001 | Nonay | |
| 6,679,858 B2 | 1/2004 | Ray | |
| 8,088,086 B1 | 1/2012 | Schmuck | |
| 8,336,501 B2 | 12/2012 | Haaf | |
| 2003/0209209 A1 | 11/2003 | Udelle et al. | |
| 2006/0207518 A1 | 9/2006 | Steffen | |
| 2014/0090607 A1* | 4/2014 | Dole et al. ................... | 119/609 |

FOREIGN PATENT DOCUMENTS

EP 287176 A1 * 10/1988 ............. A01K 13/00

* cited by examiner

*Primary Examiner* — Son T Nguyen
(74) *Attorney, Agent, or Firm* — Nils H. Ljungman & Associates (57) ABSTRACT

A portable petting device for petting or scratching of pets, such as dogs or cats. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

9 Claims, 10 Drawing Sheets

PORTABLE PETTING DEVICE FOR PETTING OR SCRATCHING OF PETS, SUCH AS DOGS OR CATS

BACKGROUND

1. Technical Field

The present application relates to devices for petting or scratching of pets, such as dogs or cats.

2. Background Information

Background information is for informational purposes only and does not necessarily admit that subsequently mentioned information and publications are prior art. In the field of pet care, some devices exist for petting pets, but they are either too complicated, or they are stationary or too bulky for use in a portable manner, thereby limiting their use and functionality.

OBJECT OR OBJECTS

An object of the present application is to provide, in at least one possible embodiment, a portable device for petting or scratching of pets, such as dogs or cats.

SUMMARY

The petting device according to at least one possible embodiment is activated by way of motion sensor by the pet to thereby automatically pet the pet and sooth them and relieve separation anxiety. A simulated hand is used that is aesthetically pleasing and resembles a human hand that pets relate to psychologically, and which they associate with the love and affection of their owners. A push pin device is used to raise or lower a petting arm to accommodate from the smallest dog to the largest dog. Unlike some petting devices, the petting device according to the present application is not stationary or attached to a wall, but rather is completely portable. The portability increases the uses of the petting device, so pet owners can move the petting device to any location in their homes, or take the petting device to other locations, such as an office or a vacation destination. Another possible use could be in veterinarian practices or possibly in temporary pet housing, such as kennels, in order to provide pets with the sensation of their owners' presence. A tension spring is utilized in conjunction with a movable arm to apply constant pressure on a pet to simulate the force of a human hand, and aids in resisting a pet's natural reaction to arch upwards to apply pressure against a human hand.

In at least one possible embodiment of the present application, a weighted base can be used to provide stability from both the movement of the movable arm, which can be a pneumatic movable arm that executes an oscillating movement, and from a pet's pushing pressure. A motion sensor is positioned on hollow shaft at a location suitable to enable a pet to activate the device when the pet passes under the movable arm. Upon activation of the sensor, a signal is sent to activate the motor to generate movement of the movable arm. The movable arm is moved in a substantially horizontal or essentially horizontal or horizontal plane back and forth in an arcing motion of approximately 45 degrees. The action will stimulate the pet with a scratching or petting sensation until the pet is satisfied. After the pet has reached gratification he will exit out from under the movable arm, at which time the motion sensor will deactivate the petting device until the pet returns to activate the petting device once again.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

It should be understood that the figures of this application show at least one or more possible embodiments of the petting device for petting or scratching of pets. Different variations and components are shown in the figures. It should be understood that any component of one embodiment could possibly be combined with or utilized in another embodiment, and thus the figures should not be construed as limiting the possible embodiments of the petting device to the embodiments explicitly disclosed in the figures.

Figure 1:
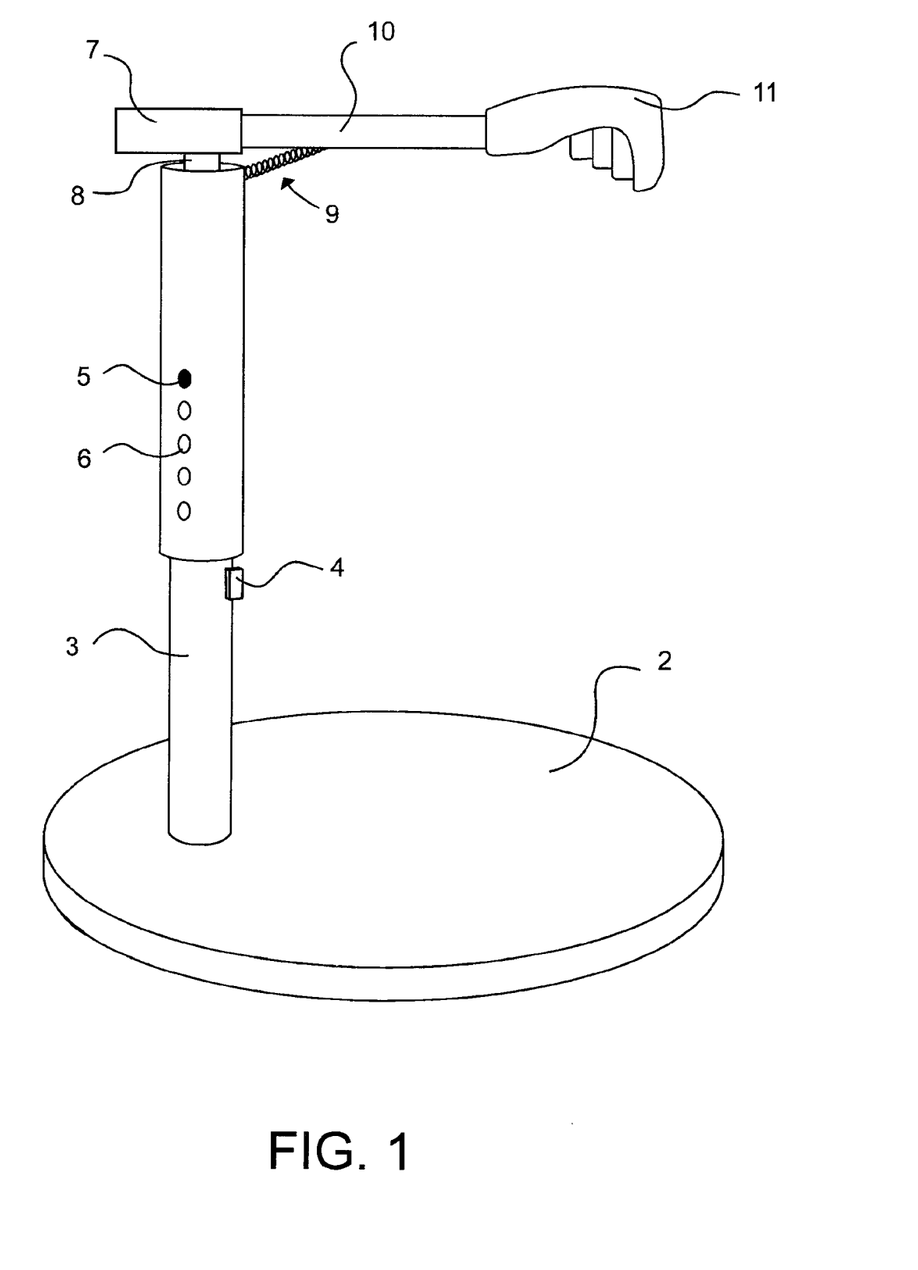
FIG. 1 shows at least one possible embodiment of a petting device for petting or scratching of pets.

FIG. 1 shows at least one possible embodiment of the petting device for petting or scratching of pets. The petting device is adjustable in height, and in the embodiment shown in FIG. 1 the height adjustment may be accomplished by a hole and pin system. A plurality of adjustment holes 6 are located in a sleeve or cylinder which is slidable up and down on the shaft 3. A spring-loaded push pin or button 5 projects out through one of the holes 6 to lock the sleeve in place. To adjust the height of the movable arm, a user can depress the pin 5 inwardly and then slide the sleeve up or down to align one of the holes 6 with the pin 5. Once the hole 6 corresponding to the desired arm height is aligned with the pin 5, the pin 5 will project out through the hole 6 and lock the sleeve in place. Other suitable height adjustment systems or arrangements could be utilized in place of the hole and pin system.

A sensor 4, which can be a motion sensor or other type of sensor, is located on the shaft 3. When a pet desires a petting or scratching, he will walk under the arm 10 and consequently in front of the sensor 4. When the sensor 4 detects the presence of a pet under the arm 10, a signal is generated to start the motor 7 connected to the arm 10. The motor 7 moves the arm in an oscillating manner in a substantially horizontal or essentially horizontal or horizontal plane back and forth or a combination of both movements in an arcing motion over a span of approximately 45 degrees, or a span in the range of 35 to 55 degrees, or increments within that range or a smaller range. The back and forth or side to side motion replicates the action of a human hand executing a petting or scratching motion. A life-like hand 11 is attached to the end of the arm 10 to further simulate an actual petting or scratching by a pet owner. The arm 10 is mounted on or connected to or supported by a ball joint 8, which permits the full range of motions of the arm 10. In addition, it is the natural reaction of most pets when being petted or scratched to arch or press into the hand doing the petting or scratching. To compensate for this pressing, as well as to apply a light pressure to the pet, a spring 9 is included to tension the arm 10 against the pet. Once a pet has been scratched and/or petted sufficiently, the pet will exit out from under the arm 10, and thus out of the sensing field of the sensor 4. Upon no longer detecting the presence of the pet, another signal is sent from the sensor 4 to the motor 7 to deactivate the motor 7 and stop the movement of the arm 10.

In another possible embodiment, the operation of the motor 7 could be set to a timer. When the sensor 4 detects the presence of a pet and activates the motor 7, a timer sets the operation of the motor 7 to a predetermined time. When the time has expired, the motor 7 deactivates, regardless of whether a pet is present or not. In another possible embodiment, a torsion spring or other tensioning device could be used in place of the external spring 9. In another possible embodiment, the sensor 4 could be programmed such that it only activates the motor 7 upon detecting the continuous presence of an object for a predetermined period of time. In this manner, accidental activation of the petting device by a person or pet walking by the sensor 4 can be avoided or minimized. In at least one other possible embodiment, the hand 11 could be constructed from different materials and could be configured in different shapes and styles. For example, smoother or rougher materials could be used on the exterior surface of the hand 11 that contacts the pets to thereby vary the petting or scratching action. Edges or ridges that simulate fingernails could be added to enhance the scratching action.

Figure 2:
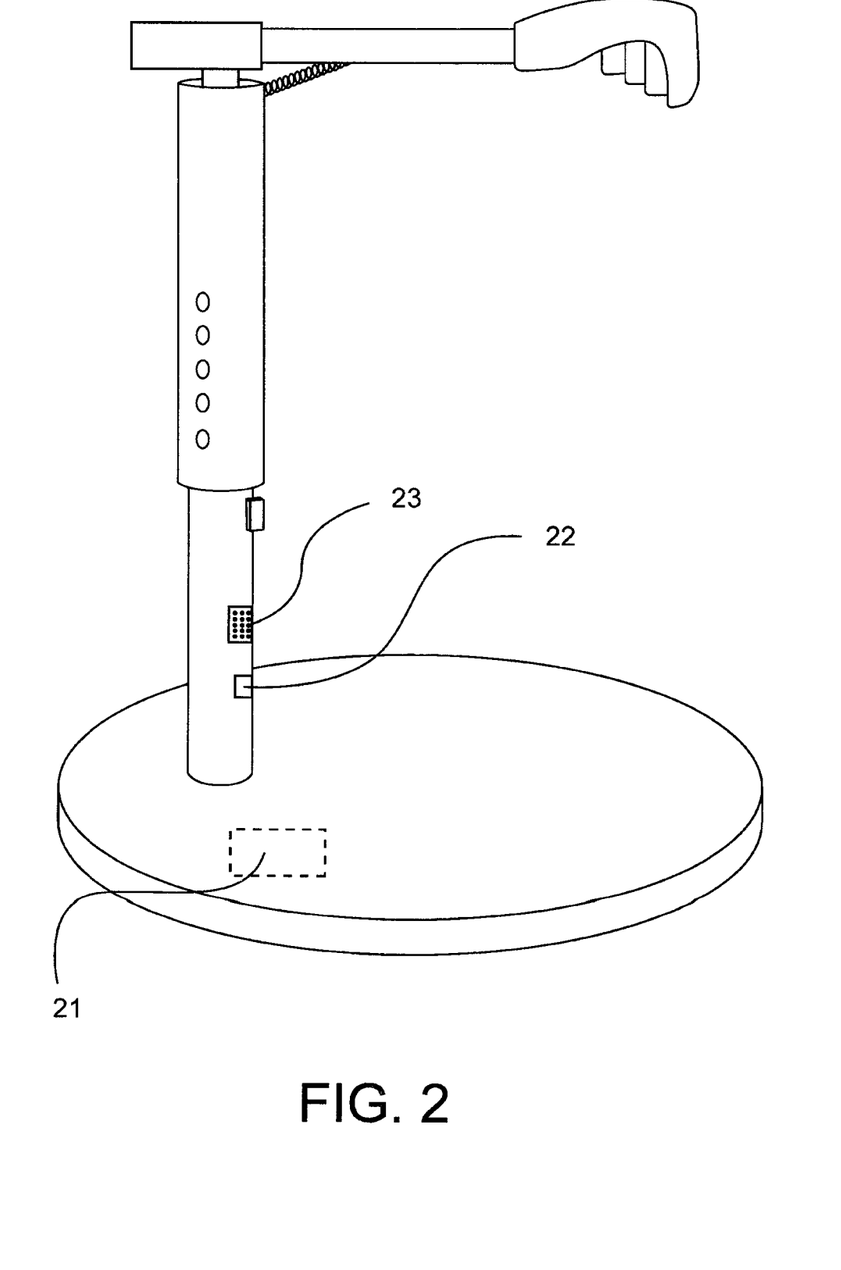
FIG. 2 shows at least one other possible embodiment of the petting device for petting or scratching of pets.

FIG. 2 shows at least one other possible embodiment of the petting device for petting or scratching of pets. In the embodiment shown in FIG. 2, the electrical cord 1 has been removed and a battery unit 21 has been added to the base 2 to supply power to the petting device. The battery unit 21 can be a battery receptacle designed to receive and contain a suitable battery pack or one or more individual batteries. The battery unit 21 could also be a rechargeable battery pack that can be connected in a suitable manner to a recharging unit or wall outlet to recharge the rechargeable battery pack.

In addition, FIG. 2 discloses a microphone 22 and speaker 23. The microphone 22 could be used to receive noises from the pet, such as barking, yelping, or meowing, to generate a certain response from the petting device. The microphone 22 could be used in conjunction with the sensor 4 to initiate action of the petting device. For example, the petting device could be activated by a dog barking or cat meowing when the pet is at or near the petting device. In addition, the petting device could be designed with a control system that, based on the volume and/or pitch of the dog's barking, initiates different speeds and/or forcefulness of the petting action. For example, it may be desirable to pet or scratch a larger dog much more forcefully or vigorously than a smaller dog. A larger dog would likely have a deeper or louder bark than a smaller dog. The petting device could then pet the larger dog more vigorously upon receiving a deeper or louder barking sound. The speaker 23 is utilized to produce sounds for a pet utilizing the petting device. The speaker 23 could be used to emit a recorded message and/or pleasant sounds to enhance the petting or scratching experience for the pet. The speaker 23 could be activated with the activation of the petting device, or possibly in response to a sound generated by the pet.

Figure 3:
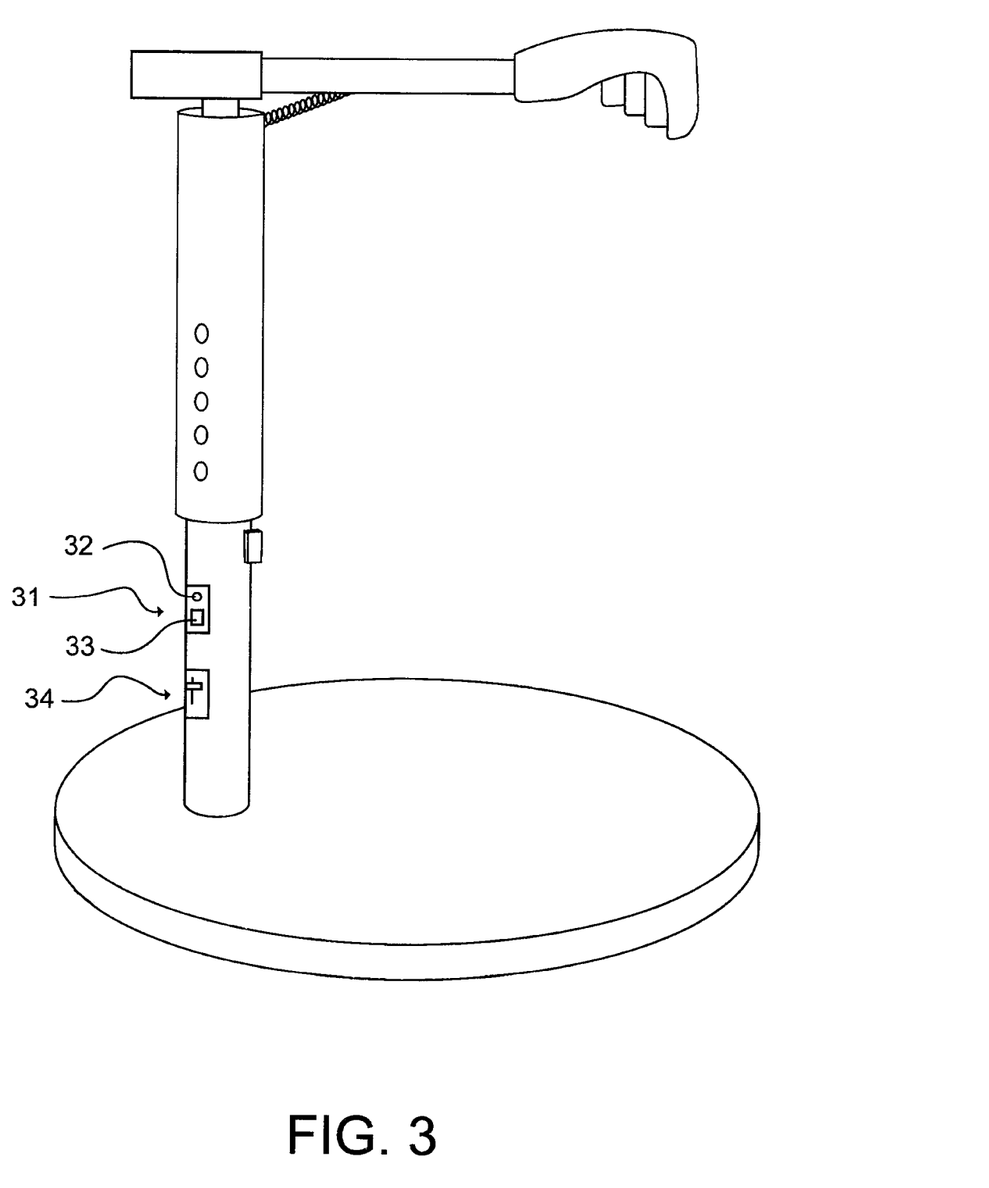
FIG. 3 shows at least one further possible embodiment of the petting device for petting or scratching of pets.

FIG. 3 shows at least one further possible embodiment of the petting device for petting or scratching of pets. In this embodiment, a recording unit 31 is included in the petting device. The recording unit 31 could be used to record a message or other vocal sounds to be played back to the pet, such as via the speaker 23 or an audio output integrated into the recording unit 31. The recording unit 31 includes a record button 32 and audio input or microphone 33. To record a message, the pet owner depresses the record button 32 to initiate recording, speaks into the microphone 33, then depresses the record button 32 again to stop recording. The recorded message would then play during usage of the petting device or in response to sounds from the pet. The recorded message could further enhance the comforting experience of using the petting device by allowing the pet to hear its owner's voice and/or soothing or encouraging statements or sounds. A volume control 34 is also included to vary the volume of the audio. The volume control 34 could also be used in the embodiment shown in FIG. 2. The recording unit 31 and volume control 34 are shown for exemplary purposes, and it should be understood that any suitable recording unit and volume control could be utilized in the petting device.

Figure 4:
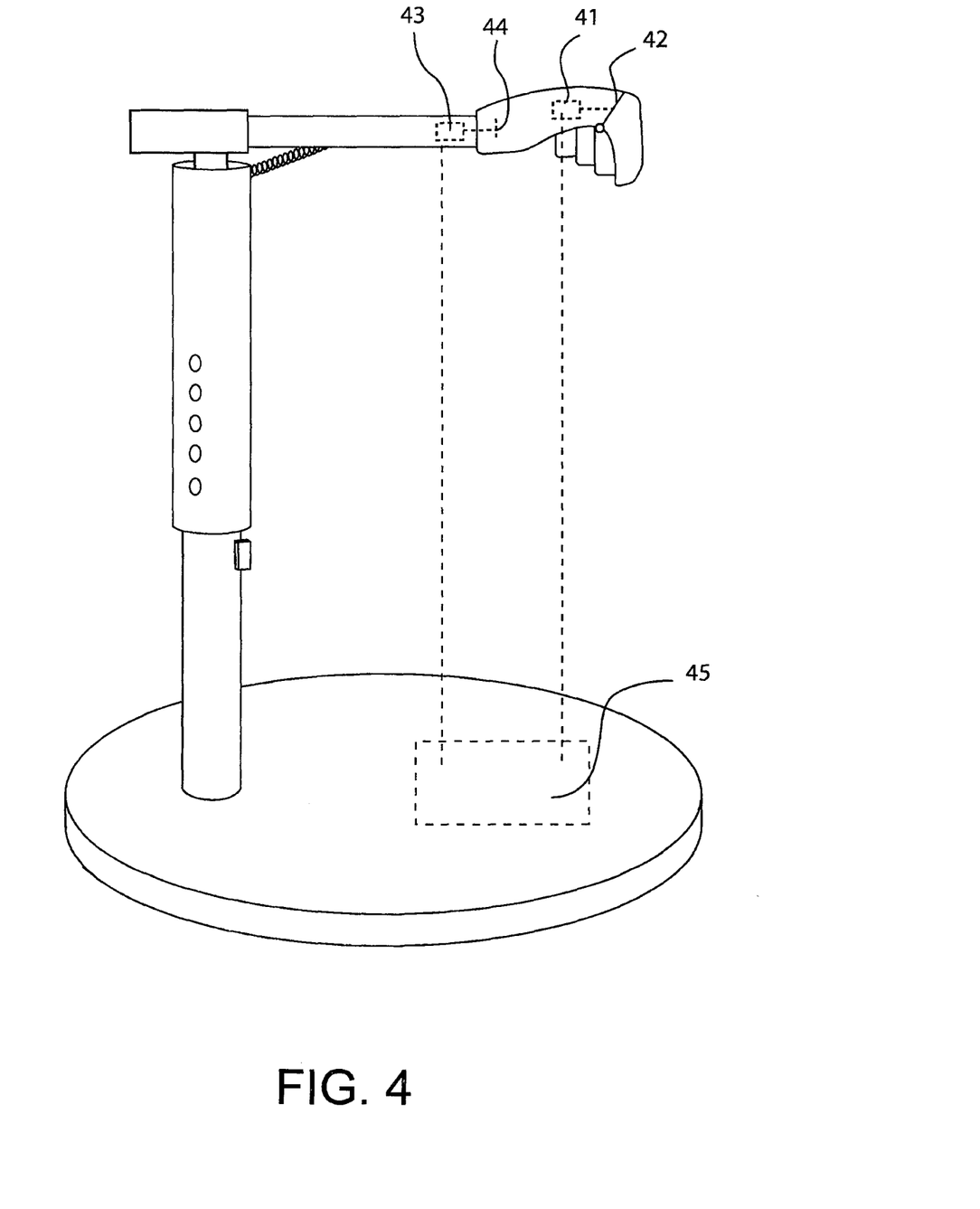
FIG. 4 shows at least one other possible embodiment of the petting device for petting or scratching of pets.

FIG. 4 shows at least one other possible embodiment of the petting device for petting or scratching of pets. In this embodiment, arm 10 and hand 11 have been made adjustable and/or moveable. The hand 11 includes a hinge or articulation 42 that permits the fingers of the hand 11 to move back and forth to simulate a scratching motion. The movement is controlled by a motor 41, which is operatively connected to and controlled by suitable control electronics 45 in the petting device, such as a computer control unit. In addition, a back and forth movement of the entire hand 11 could be controlled by a motor 43 that is connected to the hand 11 by a connection 44, such as a piston-type structure. The motor 43 is also operatively connected to and controlled by the control electronics 45. It should be noted that the control electronics 45 could be designed and programmed to be used with any of the embodiments of the petting device disclosed herein to control any of the functions of the petting device.

Figure 5:
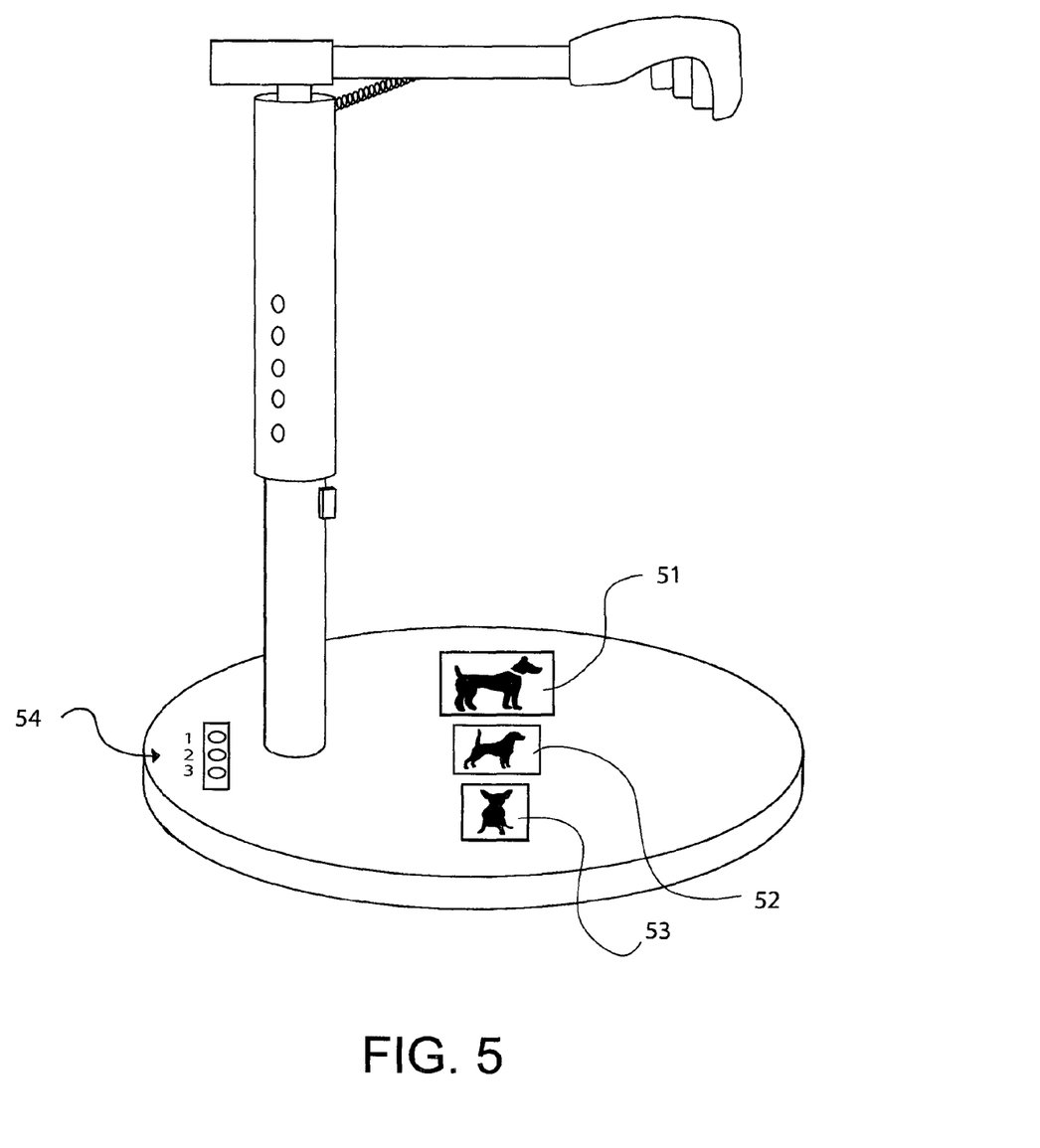
FIG. 5 shows at least one further possible embodiment of the petting device for petting or scratching of pets.

FIG. 5 shows at least one further possible embodiment of the petting device for petting or scratching of pets. In this embodiment, two control systems are shown which could be utilized to control the speed of movement of the petting arm 10. The first control system is a group of buttons or pads 51, 52, and 53 which could be activated by a pet. In the example shown, a large button 51 with a symbol of a large dog thereon can be depressed or contacted by the paw of a dog to initiate a high speed or vigorous petting consistent with a large dog. A medium or mid-sized button 52 with a symbol of a mid-sized dog thereon can be depressed or contacted by the paw of a dog to initiate a medium speed or regular petting consistent with a mid-sized dog. Finally, a small button 53 with a symbol of a small dog thereon can be depressed or contacted by the paw of a dog to initiate a slow speed or light petting consistent with a small dog. Not only could the speeds be varied in this manner, but also possibly the range of the petting motion, since larger pets may need a greater or longer petting to contact more of the pet's body than would a smaller pet. For example, a Great Dane may enjoy a more vigorous scratching or petting over a greater area of its body than would a Chihuahua. With such a system, the pet can learn or be trained to initiate a desired operation of the petting device according to what type of petting or scratching the pet enjoys most. As an alternative, a push button system 54 to be operated by the pet owner could be utilized to control the operation of the petting device. In the embodiment shown, the push button system 54 has three settings, though obviously more or less could be included. Further, any type of suitable control could be incorporated, such as a digital control, instead of a push button system 54, which control could be connected to the control electronics 45 to control and/or customize various operating features or characteristics of the petting device. The dog-controlled or pet-controlled control systems shown in FIG. 5 could either be used together in a single device, or could be installed alone in different embodiments of the petting device.

Figure 6:
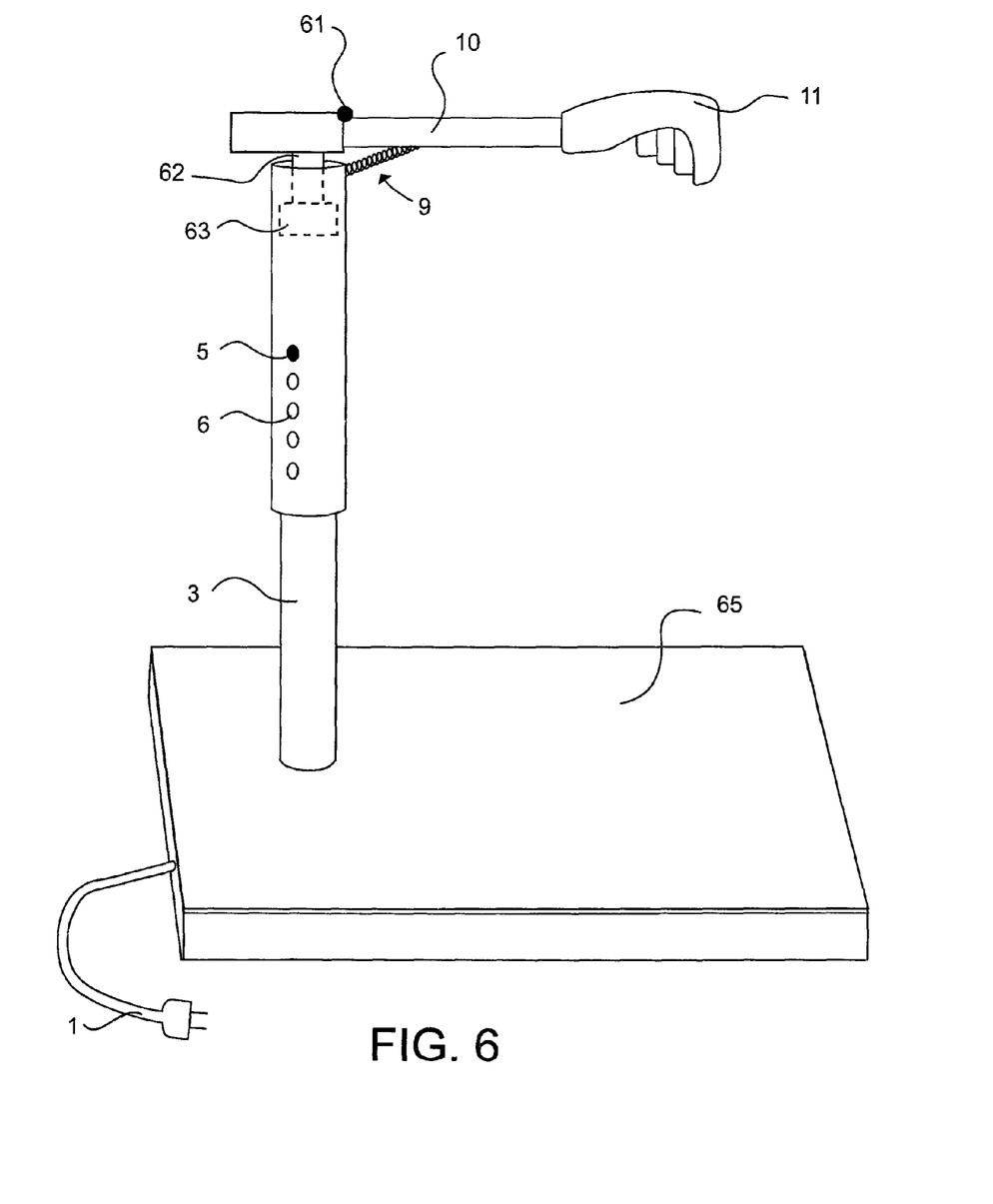
FIG. 6 shows at least one other possible embodiment of the petting device for petting or scratching of pets.

FIG. 6 shows at least one other possible embodiment of the petting device for petting or scratching of pets. In this embodiment, instead of the motor 7 shown in FIG. 1, a motor 63 is disposed in the shaft or column 3. This motor 63 is connected by a connecting piece or shaft 62 to provide reciprocating or rotating motion to the arm 10. In addition, a hinge or articulation 61 is used to permit the arm 10 to pivot or give when pressed into by the body of a pet. The spring 9 is still used to provide resistance to the pressing force of the body of the pet. In addition, the base plate 1 has been replaced with a mat or plate 65, which can be rectangular or square to increase surface area. The mat 65 can include a touch pad to be activated by a pet standing thereon. Such a touch pad could be used in place of or in conjunction with the sensor 4 to detect when a pet is in position to utilize the petting device. Again, any of the components of the petting device disclosed herein can be used in any combination with any other components disclosed in the embodiments of the petting device disclosed herein.

Figure 7:
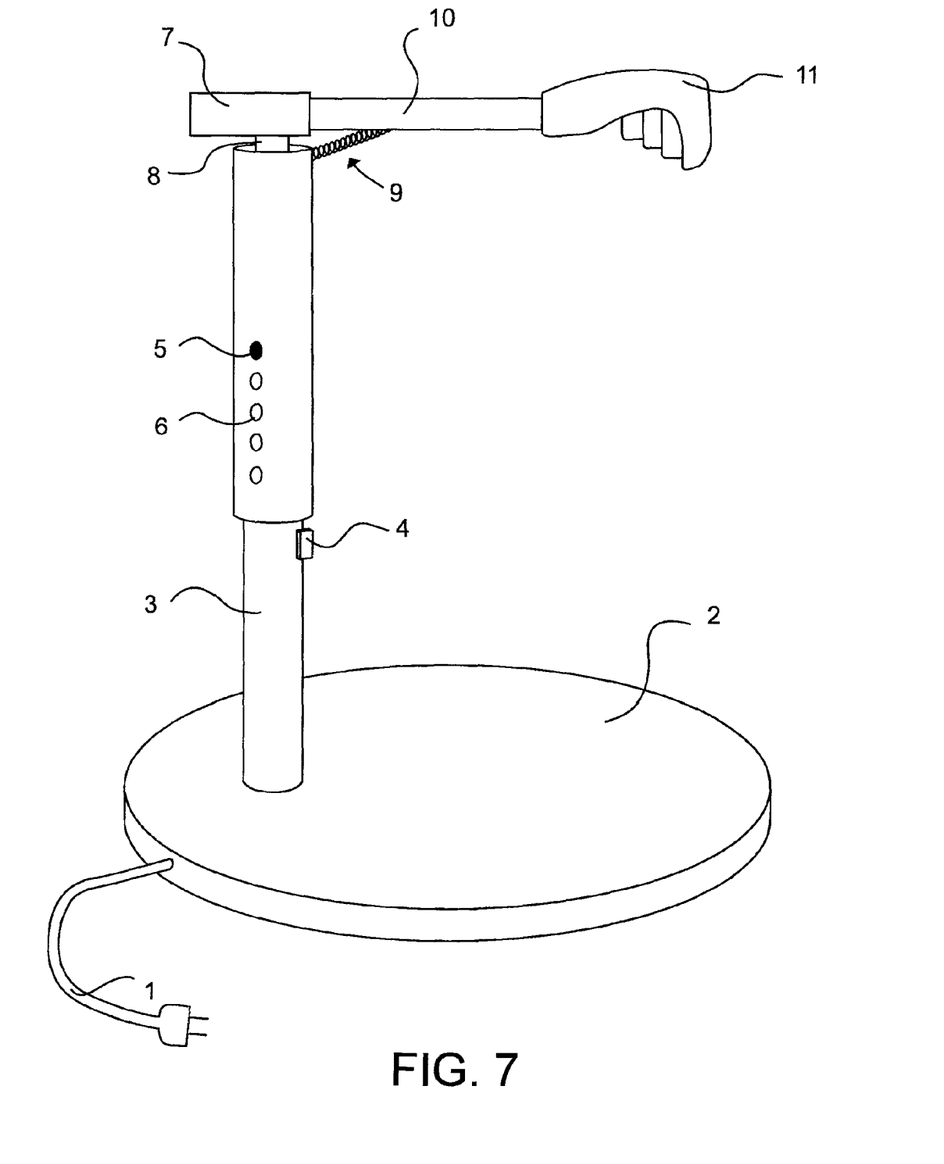
FIG. 7 shows at least one possible embodiment of a petting device for petting or scratching of pets with an electric cord.

FIG. 7 shows at least one possible embodiment of the petting device for petting or scratching of pets. An electrical cord 1 is provided that can be plugged into a wall outlet to supply power to the petting device. The electrical cord 1 enters through a hole in the rear of a weighted base plate 2. Wiring running up through a shaft or hollow shaft 3 connects the electrical cord 1 to a motor 7 to supply power to the motor 7. The petting device is adjustable in height, and in the embodiment shown in FIG. 7 the height adjustment may be accomplished by a hole and pin system. A plurality of adjustment holes 6 are located in a sleeve or cylinder which is slidable up and down on the shaft 3. A spring-loaded push pin or button 5 projects out through one of the holes 6 to lock the sleeve in place. To adjust the height of the movable arm, a user can depress the pin 5 inwardly and then slide the sleeve up or down to align one of the holes 6 with the pin 5. Once the hole 6 corresponding to the desired arm height is aligned with the pin 5, the pin 5 will project out through the hole 6 and lock the sleeve in place. Other suitable height adjustment systems or arrangements could be utilized in place of the hole and pin system.

A sensor 4, which can be a motion sensor or other type of sensor, is located on the shaft 3. When a pet desires a petting or scratching, he will walk under the arm 10 and consequently in front of the sensor 4. When the sensor 4 detects the presence of a pet under the arm 10, a signal is generated to start the motor 7 connected to the arm 10. The motor 7 moves the arm in an oscillating manner in a substantially horizontal or essentially horizontal or horizontal plane back and forth or a combination of both movements in an arcing motion over a span of approximately 45 degrees, or a span in the range of 35 to 55 degrees, or increments within that range or a smaller range. The back and forth or side to side motion replicates the action of a human hand executing a petting or scratching motion. A life-like hand 11 is attached to the end of the arm 10 to further simulate an actual petting or scratching by a pet owner. The arm 10 is mounted on or connected to or supported by a ball joint 8, which permits the full range of motions of the arm 10. In addition, it is the natural reaction of most pets when being petted or scratched to arch or press into the hand doing the petting or scratching. To compensate for this pressing, as well as to apply a light pressure to the pet, a spring 9 is included to tension the arm 10 against the pet. Once a pet has been scratched and/or petted sufficiently, the pet will exit out from under the arm 10, and thus out of the sensing field of the sensor 4. Upon no longer detecting the presence of the pet, another signal is sent from the sensor 4 to the motor 7 to deactivate the motor 7 and stop the movement of the arm 10.

Figure 8:
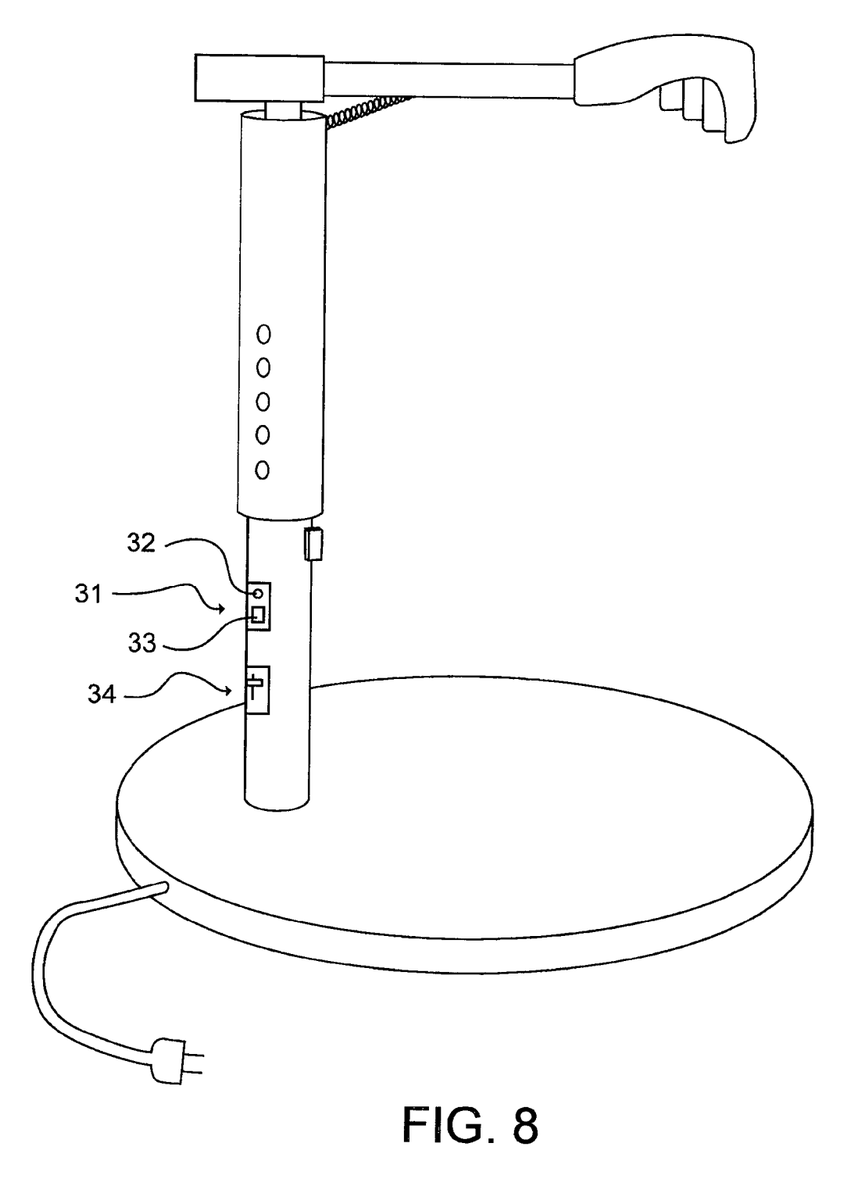
FIG. 8 shows at least one further possible embodiment of the petting device for petting or scratching of pets with an electric cord.

FIG. 8 shows at least one further possible embodiment of the petting device for petting or scratching of pets, in which an electrical cord is provided that can be plugged into a wall outlet to supply power to the petting device. In this embodiment, a recording unit 31 is included in the petting device. The recording unit 31 could be used to record a message or other vocal sounds to be played back to the pet, such as via the speaker 23 or an audio output integrated into the recording unit 31. The recording unit 31 includes a record button 32 and audio input or microphone 33. To record a message, the pet owner depresses the record button 32 to initiate recording, speaks into the microphone 33, then depresses the record button 32 again to stop recording. The recorded message would then play during usage of the petting device or in response to sounds from the pet. The recorded message could further enhance the comforting experience of using the petting device by allowing the pet to hear its owner's voice and/or soothing or encouraging statements or sounds. A volume control 34 is also included to vary the volume of the audio. The volume control 34 could also be used in the embodiment shown in FIG. 2. The recording unit 31 and volume control 34 are shown for exemplary purposes, and it should be understood that any suitable recording unit and volume control could be utilized in the petting device.

Figure 9:
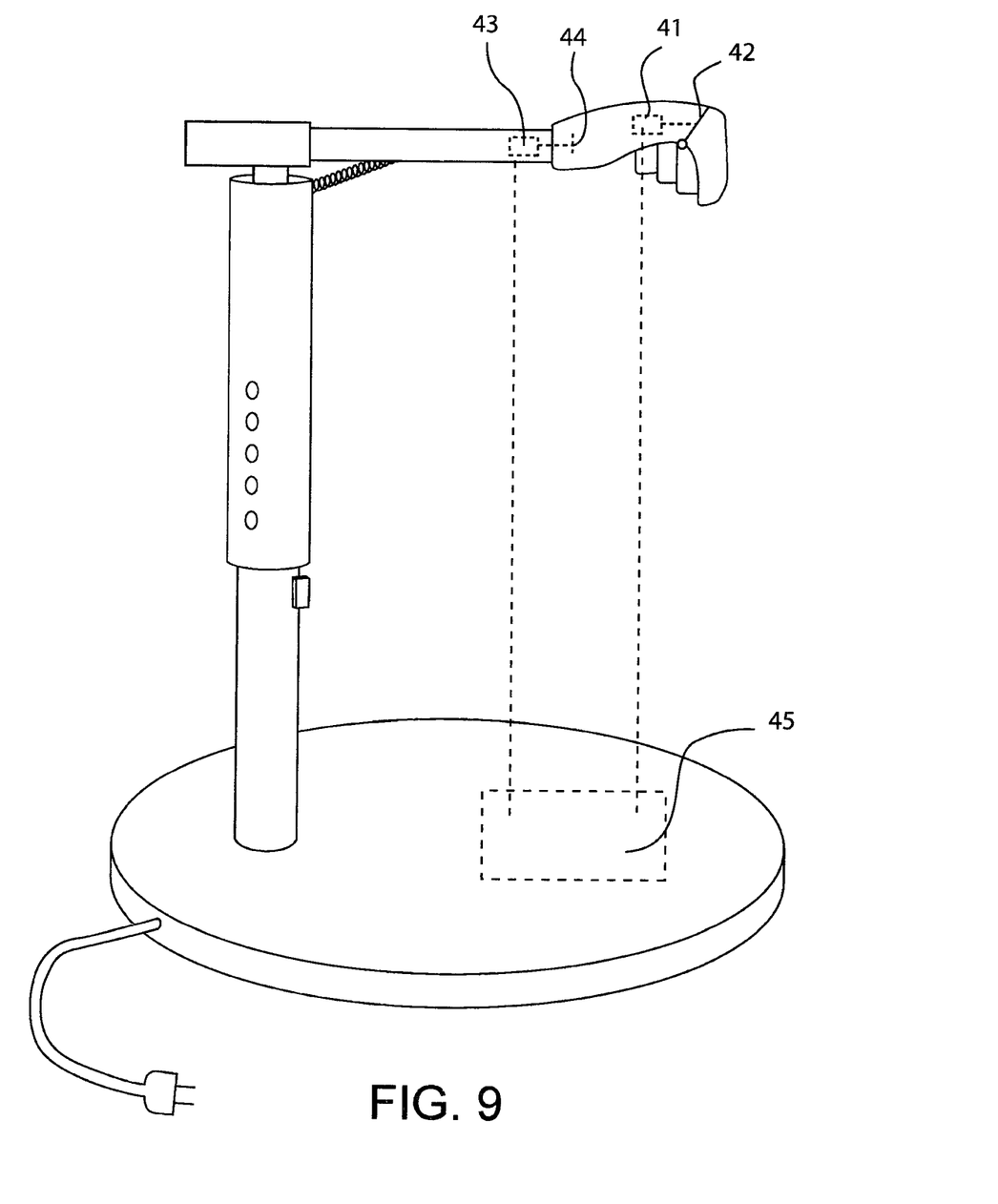
FIG. 9 shows at least one other possible embodiment of the petting device for petting or scratching of pets with an electric cord.

FIG. 9 shows at least one other possible embodiment of the petting device for petting or scratching of pets, in which an electrical cord is provided that can be plugged into a wall outlet to supply power to the petting device. In this embodiment, arm 10 and hand 11 have been made adjustable and/or moveable. The hand 11 includes a hinge or articulation 42 that permits the fingers of the hand 11 to move back and forth to simulate a scratching motion. The movement is controlled by a motor 41, which is operatively connected to and controlled by suitable control electronics 45 in the petting device, such as a computer control unit. In addition, a back and forth movement of the entire hand 11 could be controlled by a motor 43 that is connected to the hand 11 by a connection 44, such as a piston-type structure. The motor 43 is also operatively connected to and controlled by the control electronics 45. It should be noted that the control electronics 45 could be designed and programmed to be used with any of the embodiments of the petting device disclosed herein to control any of the functions of the petting device.

Figure 10:
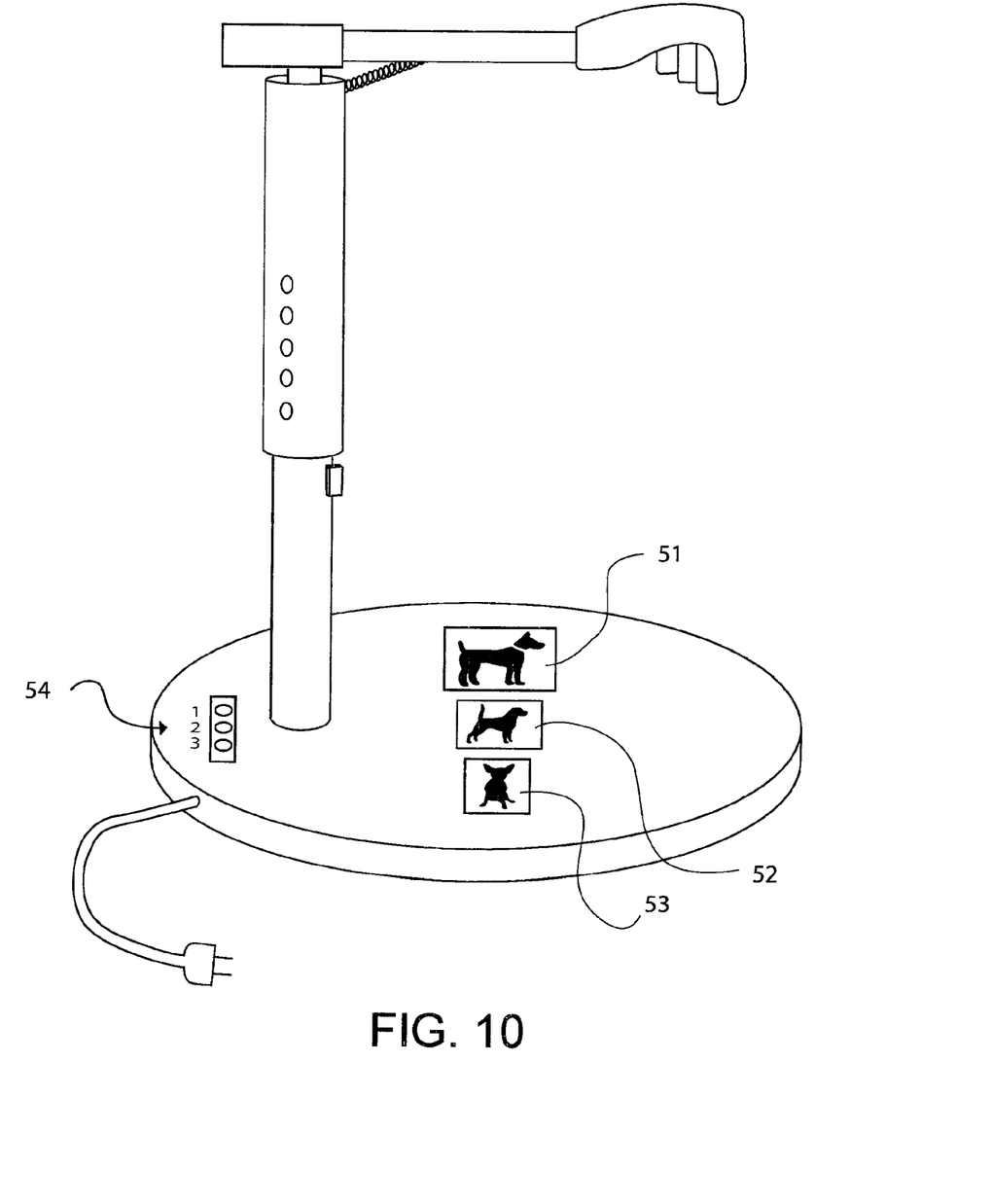
FIG. 10 shows at least one further possible embodiment of the petting device for petting or scratching of pets with an electric cord.

FIG. 10 shows at least one further possible embodiment of the petting device for petting or scratching of pets, in which an electrical cord is provided that can be plugged into a wall outlet to supply power to the petting device. In this embodiment, two control systems are shown which could be utilized to control the speed of movement of the petting arm 10. The first control system is a group of buttons or pads 51, 52, and 53 which could be activated by a pet. In the example shown, a large button 51 with a symbol of a large dog thereon can be depressed or contacted by the paw of a dog to initiate a high speed or vigorous petting consistent with a large dog. A medium or mid-sized button 52 with a symbol of a mid-sized dog thereon can be depressed or contacted by the paw of a dog to initiate a medium speed or regular petting consistent with a mid-sized dog. Finally, a small button 53 with a symbol of a small dog thereon can be depressed or contacted by the paw of a dog to initiate a slow speed or light petting consistent with a small dog. Not only could the speeds be varied in this manner, but also possibly the range of the petting motion, since larger pets may need a greater or longer petting to contact more of the pet's body than would a smaller pet. For example, a Great Dane may enjoy a more vigorous scratching or petting over a greater area of its body than would a Chihuahua. With such a system, the pet can learn or be trained to initiate a desired operation of the petting device according to what type of petting or scratching the pet enjoys most. As an alternative, a push button system 54 to be operated by the pet owner could be utilized to control the operation of the petting device. In the embodiment shown, the push button system 54 has three settings, though obviously more or less could be included. Further, any type of suitable control could be incorporated, such as a digital control, instead of a push button system 54, which control could be connected to the control electronics 45 to control and/or customize various operating features or characteristics of the petting device. The dog-controlled or pet-controlled control systems shown in FIG. 5 could either be used together in a single device, or could be installed alone in different embodiments of the petting device.

In another possible embodiment, the operation of the motor 7 could be set to a timer. When the sensor 4 detects the presence of a pet and activates the motor 7, a timer sets the operation of the motor 7 to a predetermined time. When the time has expired, the motor 7 deactivates, regardless of whether a pet is present or not. In another possible embodiment, a torsion spring or other tensioning device could be used in place of the external spring 9. In another possible embodiment, the sensor 4 could be programmed such that it only activates the motor 7 upon detecting the continuous presence of an object for a predetermined period of time. In this manner, accidental activation of the petting device by a person or pet walking by the sensor 4 can be avoided or minimized. In at least one other possible embodiment, the hand 11 could be constructed from different materials and could be configured in different shapes and styles. For example, smoother or rougher materials could be used on the exterior surface of the hand 11 that contacts the pets to thereby vary the petting or scratching action. Edges or ridges that simulate fingernails could be added to enhance the scratching action.

One feature or aspect of an embodiment is believed at the time of the filing of this patent application to possibly reside broadly in a portable petting device configured for petting or scratching pets is disclosed. The petting device comprises: a stabilized base; a pillar stand extending vertically from said stabilized base; said pillar stand being configured to be vertically adjustable; an arm extending radially from said pillar stand; a ball joint disposed between said pillar stand and said arm, said ball joint being configured to permit movement of said arm up and down and back and forth, with respect to said stabilized base; a petting or scratching tool disposed at the end of said arm; said arm and said petting or scratching tool being biased toward said stabilized base, about said ball joint, with a force sufficient to pet or scratch a pet with said petting or scratching tool and permit the pet to move said petting or scratching tool away from said stabilized base; a motor configured and disposed to move said arm and said petting or scratching tool back and forth about said stabilized base, upon a pet being present under said petting or scratching tool; and a sensor configured to energize said motor on upon a pet being present and deenergize said motor upon a pet not being present.

Another feature or aspect of an embodiment is believed at the time of the filing of this patent application to possibly reside broadly in a portable petting device further comprising a spring mechanism configured and disposed to bias said arm toward said stabilized base, about said ball joint.

Yet another feature or aspect of an embodiment is believed at the time of the filing of this patent application to possibly reside broadly in a portable petting device configured for petting or scratching pets wherein said petting or scratching tool comprises a lifelike hand configured and disposed to move with said arm and to pet or scratch a sensed pet.

Still another feature or aspect of an embodiment is believed at the time of the filing of this patent application to possibly reside broadly in a portable petting device configured for petting or scratching pets wherein said lifelike hand comprises fingernails configured and disposed to scratch the sensed pet.

A further feature or aspect of an embodiment is believed at the time of the filing of this patent application to possibly reside broadly in a portable petting device configured for petting or scratching pets wherein said lifelike hand is configured to articulate said fingernails.

Another feature or aspect of an embodiment is believed at the time of the filing of this patent application to possibly reside broadly in a portable a petting device configured for petting or scratching pets wherein said motor is an electric motor.

Yet another feature or aspect of an embodiment is believed at the time of the filing of this patent application to possibly reside broadly in a portable petting device configured for petting or scratching pets configured to deenergize said motor and dispose said petting or scratching tool to a neutral position, upon a pet not being sensed.

Still another feature or aspect of an embodiment is believed at the time of the filing of this patent application to possibly reside broadly in a portable petting device configured for petting or scratching pets wherein said sensor is disposed with said stabilized base or said pillar stand.

A further feature or aspect of an embodiment is believed at the time of the filing of this patent application to possibly reside broadly in a portable petting device configured for petting or scratching pets further comprising a timer configured and disposed to deeergize said motor upon the expiration of a set time period.

One feature or aspect of an embodiment is believed at the time of the filing of this patent application to possibly reside broadly in a method for petting or scratching pets with a portable petting device configured for petting or scratching pets, said device comprising: a stabilized base; a pillar stand extending vertically from said stabilized base; said pillar stand being configured to be vertically adjustable; an arm extending radially from said pillar stand; a ball joint disposed between said pillar stand and said arm, said ball joint being configured to permit movement of said arm up and down and back and forth, with respect to said stabilized base; a petting or scratching tool disposed at the end of said arm; said arm and said petting or scratching tool being biased toward said stabilized base, about said ball joint, with a force sufficient to pet or scratch a pet with said petting or scratching tool and permit the pet to move said petting or scratching tool away from said stabilized base; a motor configured and disposed to move said arm and said petting or scratching tool back and forth about said stabilized base, upon a pet being present under said petting or scratching tool; and a sensor configured to energize said motor on upon a pet being present and deenergize said motor upon a pet not being present; said method comprising the steps of: stabilizing said stabilized base; extending said pillar stand vertically from said stabilized base; adjusting said pillar stand to a desired vertical length; extending said arm radially from said pillar stand; biasing said arm toward said stabilized base about said ball joint; the pet moving said arm and said petting or scratching device away from said stabilized base, with the force of the pet pushing against the biased arm; sensing the pet about said stabilized base; energizing said motor upon sensing the pet about said stabilized base; and moving said arm and said petting or scratching tool back and forth about said stabilized base and petting or scratching the sensed pet.

Another feature or aspect of an embodiment is believed at the time of the filing of this patent application to possibly reside broadly in a method for petting or scratching pets wherein said step of biasing said arm toward said stabilized base about said ball joint comprises applying a force with a spring mechanism.

Yet another feature or aspect of an embodiment is believed at the time of the filing of this patent application to possibly reside broadly in a method for petting or scratching pets wherein said petting or scratching tool comprises a lifelike hand and said step of moving said arm and said petting or scratching tool back and forth about said stabilized base comprises moving said lifelike hand and petting or scratching the sensed pet.

Still another feature or aspect of an embodiment is believed at the time of the filing of this patent application to possibly reside broadly in a method for petting or scratching pets wherein said lifelike hand comprises fingernails and said step of moving said arm and said petting or scratching tool back and forth about said stabilized base comprises moving said lifelike hand and said fingernails and scratching the sensed pet.

A further feature or aspect of an embodiment is believed at the time of the filing of this patent application to possibly reside broadly in a method for petting or scratching pets of claim 3 further comprising a step of articulating said fingernails.

Another feature or aspect of an embodiment is believed at the time of the filing of this patent application to possibly reside broadly in a method for petting or scratching pets wherein said motor is an electric motor.

Yet another feature or aspect of an embodiment is believed at the time of the filing of this patent application to possibly reside broadly in a method for petting or scratching pets further comprising the steps of deenergizing said motor and disposing said petting or scratching tool to a neutral position, upon a pet not being sensed.

Still another feature or aspect of an embodiment is believed at the time of the filing of this patent application to possibly reside broadly in a method for petting or scratching pets wherein said step of sensing a pet about said stabilized base comprises sensing the pet with said sensor disposed with said stabilized base or said pillar stand.

A further feature or aspect of an embodiment is believed at the time of the filing of this patent application to possibly reside broadly in method for petting or scratching pets further comprising a step of timing said step of moving said arm and said petting or scratching tool back and forth about said stabilized base and deenergizing said motor upon the expiration of a set time period.

One feature or aspect of an embodiment is believed at the time of the filing of this patent application to possibly reside broadly in a method for petting or scratching pets comprising the steps of: stabilizing a stabilized base; extending a pillar stand vertically from said stabilized base; adjusting said pillar stand to a desired vertical length; extending an arm radially from said pillar stand; biasing said arm toward said stabilized base about a ball joint; the pet moving said arm and said petting or scratching device away from said stabilized base, with the force of the pet pushing against the biased arm; sensing the pet about said stabilized base; energizing said motor upon sensing the pet about said stabilized base; and moving said arm and said petting or scratching tool back and forth about said stabilized base and petting or scratching the sensed pet.

The components disclosed in the patents, patent applications, patent publications, and other documents disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, patent applications, patent publications, and other documents either incorporated by reference or not incorporated by reference.

The following patents, patent applications, patent publications, and other documents, except for the exceptions indicated herein, are hereby incorporated by reference as if set forth in their entirety herein except for the exceptions indicated herein, as follows: US 20060207518, US 20030209209, U.S. Pat. No. 8,336,501, U.S. Pat. No. 8,088,086, U.S. Pat. No. 6,679,858, U.S. Pat. No. 6,318,298, U.S. Pat. No. 6,058,887, U.S. Pat. No. 5,842,440, U.S. Pat. No. 5,680,831, U.S. Pat. No. 5,628,282, U.S. Pat. No. 5,595,141, U.S. Pat. No. 5,540,186, U.S. Pat. No. 5,016,617, U.S. Pat. No. 4,872,422, U.S. Pat. No. 3,716,029, U.S. Pat. No. 3,599,606, U.S. Pat. No. 3,552,388, and U.S. Pat. No. 2,721,538.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the embodiments therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, patent publications, and other documents, are not considered to be incorporated by reference herein for any of the patents, patent applications, patent publications, and other documents cited herein.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A portable petting device configured for petting or scratching pets comprising:
   a stabilized base;
   a pillar stand extending vertically from said stabilized base;
   said pillar stand being vertically adjustable;

a movable arm arrangement comprising a rigid arm extending radially from said pillar stand and a connecting arrangement comprising a ball joint and a motor;

said arm being connected to an upper portion of said pillar stand by said connecting arrangement;

a petting or scratching tool disposed at the end of said arm;

a spring mechanism connected to said movable arm arrangement and said pillar stand;

said motor being configured and disposed to move said arm and said petting or scratching tool back and forth upon a pet being present under said petting or scratching tool;

said ball joint permits full range of motion of said arm with respect to said pillar stand to thereby permit said petting or scratching tool to follow contours of a body of a pet throughout movement of said arm by said motor;

said arm, and thus said petting or scratching tool, being biased by said spring mechanism to a first position to tension said arm against a pet and toward the first position upon the pet moving said arm out of the first position, and thereby exert a pressure on the pet and maintain uninterrupted contact between said petting or scratching tool and the pet throughout movement of said arm by said motor; and a sensor energizes said motor upon a pet being present and deenergize said motor upon a pet not being present.

2. The portable petting device configured for petting or scratching pets of claim 1 wherein said petting or scratching tool comprises a lifelike hand configured and disposed to move with said arm and to pet or scratch a sensed pet.

3. The portable petting device configured for petting or scratching pets of claim 2, wherein said lifelike hand comprises edges that simulate fingernails configured and disposed to scratch the sensed pet.

4. The portable petting device configured for petting or scratching pets of claim 3, wherein said lifelike hand is configured to articulate a portion of said lifelike hand and thus move said fingernails connected thereto.

5. The portable petting device configured for petting or scratching pets of claim 1, wherein said motor is an electric motor.

6. The portable petting device configured for petting or scratching pets of claim 1, wherein said portable petting device is configured to deenergize said motor and dispose said petting or scratching tool to a neutral position, upon a pet not being sensed.

7. The portable petting device configured for petting or scratching pets of claim 1, wherein said sensor is disposed with said stabilized base or said pillar stand.

8. The portable petting device configured for petting or scratching pets of claim 1, wherein said portable petting device further comprises a timer configured and disposed to deenergize said motor upon expiration of a set time period.

9. The portable petting device configured for petting or scratching pets of claim 1, wherein:

said portable petting device is configured to store sound comprising pleasant sounds, music, and spoken statements;

said portable petting device further comprises a speaker configured to output said sound; and said portable petting device further comprises a microphone configured to receive said sound to permit inputting and recording of said sound for playback via said speaker.

* * * * *